US011230362B2

(12) United States Patent
Jones et al.

(10) Patent No.: US 11,230,362 B2
(45) Date of Patent: Jan. 25, 2022

(54) HYDRAULIC POWER DRIVE UNIT

(71) Applicant: Goodrich Actuation Systems Limited, West Midlands (GB)

(72) Inventors: Tony Jones, Shrewsbury (GB); Peter Bacon, Wolverhampton (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 271 days.

(21) Appl. No.: 16/376,701

(22) Filed: Apr. 5, 2019

(65) Prior Publication Data
US 2019/0308718 A1  Oct. 10, 2019

(30) Foreign Application Priority Data

Apr. 6, 2018 (EP) ..................................... 18166073

(51) Int. Cl.
*B64C 3/38* (2006.01)
*F15B 15/26* (2006.01)
(Continued)

(52) U.S. Cl.
CPC ................ *B64C 3/38* (2013.01); *B64C 13/40* (2013.01); *F15B 11/08* (2013.01); *F15B 11/10* (2013.01);
(Continued)

(58) Field of Classification Search
CPC .... F15B 11/08; F15B 2211/715; F15B 15/26; F15B 11/10; F15B 2211/7058; B64C 3/38; B64C 13/40
See application file for complete search history.

(56) References Cited

U.S. PATENT DOCUMENTS 4,244,276 A * 1/1981 Iwata ...................... F15B 11/08
91/447
4,441,675 A * 4/1984 Boehringer ............. B64C 13/24
244/194
(Continued)

FOREIGN PATENT DOCUMENTS

EP  2695810 A1  2/2014
EP  3222868 A1  9/2017
(Continued)

OTHER PUBLICATIONS

Extended European Search Report for International Application No. 18166073.9 dated Sep. 10, 2018, 8 pages.

*Primary Examiner* — Abiy Teka
*Assistant Examiner* — Daniel S Collins
(74) *Attorney, Agent, or Firm* — Cantor Colburn LLP

(57) ABSTRACT

A hydraulic power drive unit (PDU) for a transmission system includes a hydraulic motor for converting hydraulic pressure into torque and rotation; a hydraulic brake system for applying a braking force to the hydraulic motor to prevent rotation of the hydraulic motor, wherein the hydraulic brake system is biased to apply the braking force to the hydraulic motor to prevent rotation of the hydraulic motor, and configured to remove the braking force in response to a supply of hydraulic fluid; and a hydraulic circuit for supplying a flow of hydraulic fluid to the hydraulic motor to pressurise and thereby operate the hydraulic motor and for supplying hydraulic fluid to the hydraulic brake system to pressurise the hydraulic brake system and thereby remove the braking force; wherein the hydraulic circuit comprises a brake supply line for supplying the hydraulic fluid to the hydraulic brake system.

20 Claims, 2 Drawing Sheets

(51) Int. Cl.
    *B64C 13/40*          (2006.01)
    *F15B 11/10*          (2006.01)
    *F15B 11/08*          (2006.01)

(52) U.S. Cl.
    CPC ......... *F15B 15/26* (2013.01); *F15B 2211/327* (2013.01); *F15B 2211/7058* (2013.01); *F15B 2211/715* (2013.01)

(56) References Cited

U.S. PATENT DOCUMENTS

| | | |
|---|---|---|
| 4,729,222 A | 3/1988 | Tanaka et al. |
| 4,793,561 A | 12/1988 | Burda |
| 6,848,651 B2 | 2/2005 | Christensen |
| 8,240,223 B2 | 8/2012 | Jones et al. |
| 8,373,376 B2 | 2/2013 | Hausenberger et al. |
| 2018/0002028 A1 | 1/2018 | Polcuch |
| 2018/0065834 A1* | 3/2018 | Miyoshi ................. B66C 23/86 |

FOREIGN PATENT DOCUMENTS

| | | | |
|---|---|---|---|
| EP | 3272650 A1 | 1/2018 | |
| JP | 2009-167659 * | 7/2009 | ................ E02F 9/22 |
| WO | 2015021400 A1 | 2/2015 | |

\* cited by examiner

HYDRAULIC POWER DRIVE UNIT

FOREIGN PRIORITY

This application claims priority to European Patent Application No. 18166073.9 filed Apr. 6, 2018, the entire contents of which is incorporated herein by reference.

TECHNICAL FIELD

The present invention relates to a hydraulic power drive unit (PDU) configured for relieving torque locked into a transmission system, for example in the event of a transmission system jam. In particular, the present invention relates to a PDU that enables torque locked into transmission systems of aircraft high-lift systems to be relieved. The PDU may be used, for example, to operate the flaps and slats on an aircraft's wing.

BACKGROUND OF THE DISCLOSURE

The wings of fixed wing aircraft are optimised for speed and efficiency during the cruise period of a flight, since this is normally the longest portion of the flight. Such optimisation reduces the amount of drag caused by the wings, but also reduces the amount of lift that can be generated by the wings. Aircraft of this type utilise high-lift devices, such as flaps and slats provided on the aircraft's wings, so that the amount of lift generated by the wings can be altered as required during different periods of the flight. For instance, the high-lift devices can be operated during take-off and landing in order to increase the amount of lift generated by the wings so as to reduce the distances and speeds required for take-off and landing.

High-lift devices are typically arranged along the length of both wings, and are operated by high-lift transmission systems connected to a hydraulic PDU. A conventional high-lift transmission system comprises two transmission shafts extending along respective wings of the aircraft the two transmission shafts being coupled to actuators associated with the high-lift devices. These transmission shafts are also connected to a hydraulic PDU generally situated centrally in the fuselage of the aircraft to provide rotation and torque to the transmission system and to enable movement of the high-lift devices. The transmission system transmits rotation and torque generated by the PDU to the high-lift devices, and causes movement of the high-lift devices so as to increase or reduce the amount of lift generated by the wing.

Hydraulic PDUs utilise pressurised hydraulic fluid to provide power to machinery. A typical PDU used for the operation of high-lift transmission systems comprises a hydraulic motor and a brake system. When hydraulic fluid is supplied to the hydraulic motor, the motor provides rotation and torque to the transmission shafts of the transmission system. The brake system is biased by a brake biasing force to prevent rotation of the motor and thereby the transmission shafts until hydraulic fluid is provided to the brake system. In this way, any undue movement of the high-lift devices, for example caused by the effect of airloads applied to the wings, can be prevented.

When movement of the high-lift devices is required, pressurised hydraulic fluid is provided to both the hydraulic motor and the brake system. This releases the brake, allowing for rotation of the hydraulic motor, and drives the hydraulic motor which provides torque to the transmission shafts and results in displacement of the high-lift devices.

High-lift transmission systems can sometimes become jammed in such a way that one or both of the transmission shafts are prevented from rotating. For example, jamming may occur if foreign objects or contaminants enter the system, perhaps as a result of maintenance error. Alternatively, increased loads on high-lift transmission systems caused by, for example, ice formation can result in the activation of protective torque limiters, effectively causing a jam in the system. In conventional systems, the PDU continues to provide torque to the transmission shaft until the PDU drives up to its full stall torque and a stall is detected (because when a jam occurs and the speed is zero, the PDU produces maximum torque, stall torque, in order to try to accelerate the system up to the required speed). Thus, torque continues to be applied to the jammed transmission shaft and the transmission shaft becomes twisted and loaded in torsion.

Typically, once a jam in the transmission system is detected, the PDU is disconnected from the supply of hydraulic fluid and the PDU is depressurised. Depressurisation of the PDU stops the hydraulic motor from rotating and simultaneously applies the brake. By applying the brake, the motor and the transmission shafts are prevented from rotating. Thus, the transmission shaft remains loaded in torsion and the torque applied by the PDU becomes locked into the transmission shaft. In order to withstand these forces without deformation, transmission shafts may be made to have a sufficiently large diameter to prevent failure. It will be appreciated that an increase in the diameter of the transmission shafts leads to increased weight.

The loads applied to the transmission shafts may also be applied to the actuators and joints in the transmission system through their connections with the transmission shafts. For example, the transmission system may incorporate transmission joints, such as universal joints, to connect several transmission shafts. In order to withstand these loads, these components are often oversized to increase their strength. Again, this adds weight to the transmission system.

Further, in the context of a high-lift transmission system of a fixed wing aircraft, the transmission shafts that transmit torque from the PDU to the high-lift devices are typically not positioned on the neutral axis of the wing. Therefore, as a wing bends during flight the length of the transmission shaft has to change in order to maintain a connection with the PDU and the other components arranged along the wing (e.g. actuators, gearboxes, steady bearings, universal joints). This length adjustment is generally enabled by sliding spline joints positioned at interfaces between the transmission shaft and other fixed components of the high-lift transmission system.

In the event that the high-lift transmission system becomes jammed, the torque applied by the PDU becomes locked into the transmission shaft and the sliding spline joints are forced to slide under high levels of torque. Applying torque to a sliding spline joint causes increased friction between the faces of the cooperating splines of the joint, making it more difficult for the splines to slide relative to each other. This friction between the faces of the splines is proportional to the torque applied to the sliding spline joints and the coefficient of friction between the spline faces. This can lead to large push and pull loads and can generate large forces along the longitudinal axis of the spline joints into their mating components. These push and pull loads may be termed plunge loads. In order to withstand these forces, the components of the system are required to be made larger and stronger, leading to increased weight in the system.

In the context of aircraft systems, it is generally advantageous to reduce weight as much as possible to improve efficiency of the aircraft. Hence, there is a need for an improved PDU and transmission system for high-lift systems.

SUMMARY OF THE DISCLOSURE

Viewed from a first aspect, the present disclosure provides a hydraulic power drive unit (PDU) for a transmission system, the hydraulic PDU comprising: a hydraulic motor for converting hydraulic pressure into torque and rotation; a hydraulic brake system for applying a braking force to the hydraulic motor to prevent rotation of the hydraulic motor, wherein the hydraulic brake system is biased to apply the braking force to the hydraulic motor to prevent rotation of the hydraulic motor, and configured to remove the braking force in response to a supply of hydraulic pressure; and a hydraulic circuit for supplying a flow of hydraulic fluid to the hydraulic motor to pressurise and thereby operate the hydraulic motor and for supplying hydraulic fluid to the hydraulic brake system to pressurise the hydraulic brake system and thereby remove the braking force; wherein the hydraulic circuit comprises a brake supply line for supplying the hydraulic fluid to the hydraulic brake system; and wherein the brake supply line comprises a flow restricting device to restrict backflow of the hydraulic fluid in the brake supply line away from the hydraulic brake system; such that the hydraulic circuit is configured to enable depressurisation of the hydraulic motor whilst simultaneously preventing depressurisation of the hydraulic brake system thereby preventing application of the braking force.

It will be appreciated that by supplying a hydraulic fluid to the hydraulic motor the hydraulic fluid flows through the hydraulic motor so that it can operate to generate torque and rotation.

It will also be appreciated that simultaneous depressurisation of the hydraulic motor whilst preventing depressurisation of the hydraulic brake system will prevent application of the braking force and thereby allow free rotation of the hydraulic motor. By allowing free rotation of the hydraulic motor, any torque locked into a transmission shaft driven by the hydraulic PDU can be relaxed (i.e. released).

It will be further appreciated that where the supply of hydraulic fluid is described herein, this should be understood as the supply of hydraulic fluid pressure, i.e. pressurised hydraulic fluid. Equally, where hydraulic pressure is described, this will be understood as hydraulic fluid pressure, i.e. pressurised hydraulic fluid. As is very well understood, in the context of hydraulic systems, hydraulic fluid is supplied under pressure to carry out some operation, e.g. the supply of hydraulic fluid to the hydraulic brake system of the present disclosure pressurises the brake system to remove the braking force.

The flow restricting device may be a non-return valve that prevents backflow of hydraulic fluid in the brake supply line. The non-return valve may also be termed a check valve. The flow restricting device may alternatively be an active flow control valve that may be actively controlled to restrict or prevent flow of hydraulic fluid through the brake supply line.

In addition to one or more of the features described above, or as an alternative, the hydraulic circuit may be configured to enable depressurisation of the hydraulic motor by means of a motor return line. Fluid supplied to the hydraulic motor may flow away from the hydraulic motor via the motor return line to depressurise the motor.

In addition to one or more of the features described above, or as an alternative, the hydraulic circuit may be configured to depressurise the hydraulic motor upon detection of an event suggestive of a stall event.

The hydraulic PDU may comprise one or more sensors for detecting, or providing information from which can be detected, an event suggestive of a stall event of the hydraulic motor. In the event that the hydraulic motor stalls, it will stop rotating. Sensors may be provided to measure the angular speed and/or angular displacement of the output of the hydraulic PDU, e.g. an output shaft of the hydraulic motor. The output of such sensor(s) can be monitored for lack of movement which is indicative of a stall event. For example, the output of the sensors may be compared to what would be expected based on the input provided to the motor. If the output is not what is expected, e.g. the angular speed and/or displacement is less than expected, this may be indicative of a stall event. For example, the sensors may be angular displacement sensors. The measurements obtained by these may be differentiated to find the angular speed. The angular speed may be compared to a value, e.g. an expected value or a predetermined value. If the speed is less than the value, it is detected that an event suggestive of a stall event has occurred.

In addition to one or more of the features described above, or as an alternative, the hydraulic motor may rotate freely when the braking force is not applied by the hydraulic brake system.

In addition to one or more of the features described above, or as an alternative, the brake supply line may comprise a brake solenoid valve to control the flow of fluid to the hydraulic brake system and allow for depressurisation of the hydraulic brake system.

In addition to one or more of the features described above, or as an alternative, the hydraulic circuit may comprise a return line connected to the brake solenoid valve through which fluid may flow from the hydraulic brake system and the hydraulic brake system thereby depressurised, according to the control of the brake solenoid valve.

The brake solenoid valve may be a two-position solenoid valve. The brake solenoid valve may enable supply of hydraulic fluid to the hydraulic brake system when the brake solenoid valve is energised. The brake solenoid valve may enable depressurisation of the hydraulic brake system when the brake solenoid valve is de-energised.

In addition to one or more of the features described above, or as an alternative, the hydraulic motor may be a reversible hydraulic motor.

In addition to one or more of the features described above, or as an alternative, the hydraulic circuit may comprise a flow-reversing means for controlling a direction of the supply of hydraulic fluid to the hydraulic motor.

In addition to one or more of the features described above, or as an alternative, the flow-reversing means may comprise an electrohydraulic servo valve (EHSV). The EHSV may have three states; a first state in which hydraulic fluid is prevented from flowing through the EHSV, a second state in which hydraulic fluid may be supplied to an input of the hydraulic motor (e.g. for clockwise rotation), and a third state in which hydraulic fluid may be supplied to an output of the hydraulic motor (e.g. for anticlockwise rotation). The EHSV may be a linear EHSV for enabling linear control of the flow of hydraulic fluid to the hydraulic motor and hence control of speed.

The hydraulic circuit may comprise an enable solenoid valve for controlling the flow of hydraulic fluid into the hydraulic circuit. The enable solenoid valve may be a two-position solenoid valve. Additionally, the hydraulic circuit may comprise an enable spool valve that controls the flow of hydraulic fluid into the hydraulic circuit based on operation of the enable solenoid valve.

Operation of the hydraulic PDU may be controlled by a controller, which may be or comprise a computer. Hence, the present disclosure also provides a system comprising a hydraulic PDU according to any of the above described embodiments and a controller for controlling the operation of the hydraulic PDU. The controller may be configured to supply electrical control signals to the hydraulic PDU to control the supply of hydraulic fluid to the hydraulic motor and/or the hydraulic brake system. The controller may supply electrical control signals to the hydraulic PDU to control depressurisation of the hydraulic motor and/or the hydraulic brake system.

Typically, the hydraulic power drive unit is for a transmission system of an aircraft, in particular a transmission system for the operation of high-lift devices on an aircraft.

Viewed from a second aspect, the present disclosure provides a high-lift actuation system for operation of high-lift devices of an aircraft, the high-lift actuation system comprising: one or more actuators; a transmission shaft, wherein the transmission shaft is coupled to the one or more actuators to supply torque and rotation to the one or more actuators; and a hydraulic PDU according to any of the above described embodiments coupled to the transmission shaft to supply torque and rotation to the transmission shaft. The high lift actuation system may further comprise a controller configured to control the operation of the hydraulic PDU.

It will be appreciated that the high-lift actuation system may typically comprise more than one transmission shaft, each being coupled to one or more actuators to supply torque and rotation to the one of more actuators. The hydraulic PDU will therefore be coupled to the transmission shafts to supply torque and rotation to the transmission shafts.

The hydraulic PDU makes it possible to enable depressurisation of the hydraulic motor whilst simultaneously preventing depressurisation of the hydraulic brake system. Thus, application of the braking force can be prevented and the hydraulic motor can be allowed to rotate freely. It will be appreciated that by allowing free rotation of the hydraulic motor, any torque that is locked into the transmission shaft can be relaxed.

The high lift actuation system may further comprise one or more sensors for providing information from which a jam can be detected. For example, sensors may be provided for measuring the angular speed and/or displacement of the transmission shaft. Such sensors are typically part of hydraulic actuation systems for positional control, therefore, it will generally not be necessary to add additional sensors in order to detect a jam. The output of such sensor(s) can be monitored for lack of movement which is indicative of a jam in the system. For example, the output of the sensors may be compared to what would be expected based on the input provided to the motor or compared to a pre-determined value. If the output is not what is expected, e.g. the angular speed and/or displacement is less than expected, this may be indicative of a jam. Sensors may also be attached to other components of the high-lift actuation system. Sensors may alternatively or additionally be provided for measuring the output of the hydraulic PDU. For example, sensors may be provided for measuring the angular displacement of the output of the hydraulic PDU (e.g. an output shaft of the hydraulic motor). The angular speed may be determined from the angular displacement, and this compared to an expected value or pre-determined value. If the measured angular speed is less than the expected or pre-determined value, this is indicative of a jam.

The presence of a jam in the system is suggestive of a stall event of the hydraulic motor of the hydraulic PDU. Hence, detecting a jam in the high-lift actuation system infers a stall event of the hydraulic motor.

Viewed from a third aspect, the present disclosure provides an aircraft comprising: a fuselage; a wing extending from the fuselage; one or more high-lift devices arranged on the wing for altering the amount of lift generated by the wing; and a high-lift actuation system according to any of the above described embodiments, wherein the transmission shaft extends at least partially along the wing and wherein each of the one or more high lift devices is coupled to at least one of the one or more actuators for actuation of the one or more high-lift devices, and the hydraulic PDU is arranged in the fuselage.

The high-lift devices may comprise slats arranged along a leading edge of the wing. Alternatively, the high-lift devices may comprise flaps arranged along a trailing edge of the wing.

The aircraft may further comprise sensors for providing information from which a jam can be detected. Such sensors have been discussed above. For example, sensors may be provided for measuring the position of the high-lift devices. The sensors may be positioned along the wing adjacent the one or more high-lift devices. These sensors may also provide information indicative of the motion, or lack thereof, of the high-lift devices. Sensors may be provided for measuring the output of the hydraulic PDU, e.g. the angular displacement, from which angular speed can be determined. It will be appreciated that detection of the presence of a jam in the system is suggestive of a stall event of the hydraulic motor of the hydraulic PDU.

In a further aspect of the present disclosure, there is provided a method for operating a power drive unit (PDU) comprising: supplying hydraulic fluid to a hydraulic motor via a hydraulic circuit to pressurise the hydraulic motor which converts hydraulic pressure into torque and rotation; and supplying hydraulic fluid to a hydraulic brake system via a brake supply line of the hydraulic circuit to pressurise the hydraulic brake system and thereby remove a braking force applied to the hydraulic motor so as to allow for rotation of the hydraulic motor; followed by depressurising the hydraulic motor whilst restricting backflow of hydraulic fluid in the brake supply line away from the hydraulic brake system such that the hydraulic motor is depressurised whilst depressurisation of the hydraulic brake system is simultaneously prevented thereby preventing application of the braking force.

Restricting backflow of hydraulic fluid in the brake supply line may comprise preventing backflow of hydraulic fluid in the brake supply line. Backflow of hydraulic fluid in the brake supply line may be prevented by means of a non-return valve in the brake supply line.

In addition to one or more of the features described above, or as an alternative, the method may further comprise the subsequent step of depressurising the hydraulic brake system to thereby apply the braking force to the hydraulic motor to prevent rotation of the hydraulic motor. The hydraulic brake system may be depressurised by means of a brake solenoid valve which directs flow of hydraulic fluid away from the hydraulic brake system through a return line separate to the brake supply line. When fluid is directed to flow away from a device, it will be appreciated that this means it is depressurised. It will be well understood in the context of hydraulic systems that if fluid flows away from something, this does not necessarily mean that all fluid flows away. Some fluid may flow away and still cause depressurisation.

In addition to one or more of the features described above, or as an alternative, the step of depressurising the hydraulic motor whilst restricting backflow of hydraulic fluid in the brake supply line may be carried out following the detection of an event suggestive of a stall event of the motor. Therefore the method may further comprise the step of detecting an event suggestive of a stall event of the motor.

The disclosure also provides a method of operating a high-lift actuation system for operating high-lift devices of an aircraft, wherein the high-lift actuation system comprises: one or more actuators; a transmission shaft wherein the transmission shaft is coupled to the one or more actuators to supply torque and rotation to the one of more actuators; and a hydraulic PDU coupled to the transmission shaft; wherein the hydraulic PDU is operated according to any of the embodiments described above to supply torque and rotation to the transmission shaft.

The method may further comprise controlling the operation of the hydraulic PDU with a controller.

The method may further comprise detecting a jam in the high-lift actuation system. This may comprise measuring the position of parts of the high-lift actuation system measured by one or more positional sensors. It may further comprise determining an angular speed from the measured position. If this is less than an expected value, a jam is detected. The expected value may be a value based on the input to the hydraulic motor or an otherwise pre-determined value.

For example, this may comprise monitoring the angular speed and/or displacement of the transmission shaft and, if the angular speed and/or displacement of the transmission shaft is less than expected based on the input to the motor, it is determined that a jam may have occurred. Alternatively or additionally, this may comprise measuring the angular displacement of the output of the hydraulic PDU, e.g. the output shaft of the hydraulic motor, and calculating the angular speed from the angular displacement. If this is less than expected, it is determined that a jam may have occurred.

If it is determined that a jam may have occurred this is suggestive of a stall event. The step of depressurising the hydraulic motor whilst restricting backflow of hydraulic fluid in the brake supply line may only be carried out if it is determined that a jam may have occurred.

In another aspect, the disclosure provides a method of relaxing torque locked into a transmission shaft of an aircraft high-lift actuation system driven by a hydraulic motor of a hydraulic PDU, comprising: determining whether a jam may have occurred in the high-lift actuation system, and if it is determined that a jam may have occurred, then: de-pressurising the hydraulic motor to remove torque from an output shaft of the hydraulic PDU whilst simultaneously restricting backflow of hydraulic fluid in a brake supply line of a hydraulic brake system acting on the hydraulic motor, so as to prevent depressurisation of the brake system and thereby prevent application of a braking force to the hydraulic motor, whereby torque locked-in to the transmission shaft is relaxed; followed by depressurising the hydraulic brake system so as to apply the braking force to the hydraulic motor. Relaxing torque may also be considered as releasing torque.

It will be appreciated that features described in relation to a certain aspect of the disclosure may be equally applicable to other aspects of the disclosure and vice versa.

BRIEF DESCRIPTION OF THE FIGURES

Certain preferred embodiments on the present disclosure will now be described in greater detail, by way of example only and with reference to the accompanying drawings, in which.

DETAILED DESCRIPTION

By way of example, the disclosed hydraulic PDU is described in the context of a high-lift actuation system of a fixed wing aircraft. In this exemplary system, the disclosed hydraulic PDU is arranged for providing torque to a transmission system in order to operate high-lift devices arranged along the wings of the aircraft. Whilst such a system is considered to benefit advantageously from the use of the disclosed hydraulic PDU, it will be appreciated that the disclosed hydraulic PDU may also be used to equally beneficial effect in other systems.

Figure 1:
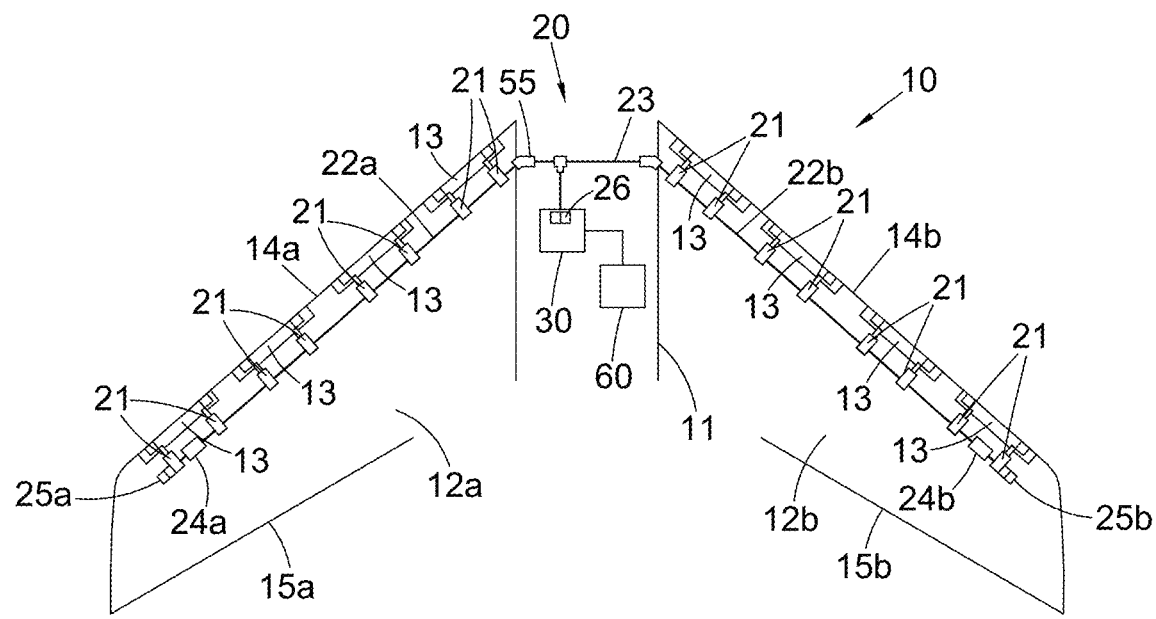
FIG. 1 shows a schematic representation of an exemplary aircraft and high-lift system.

FIG. 1 is a schematic representation of an aircraft 10, showing an exemplary high-lift actuation system 20. The aircraft 10 comprises a fuselage 11 and two wings 12a (left wing), 12b (right wing) extending therefrom. To enable control over the amount of lift and drag generated by the wings 12a, 12b, a plurality of moveable slats 13 are arranged along the leading edges 14a, 14b of the wings 12a, 12b.

Although the aircraft 10 is described as having a plurality of slats 13 arranged along the the leading edges 14a, 14b of the wings 12a, 12b, it will be appreciated that the aircraft 10 may alternatively, or in addition, be provided with other high-lift devices. For example, the aircraft 10 may have a plurality of flaps arranged along trailing edges 15a, 15b of the wings 12a, 12b. These high-lift devices may be operated instead of the slats 13, or in conjunction with the slats 13 to alter the amount of lift and drag generated by the wings 12a, 12b. As will be readily understood, the operation of these other high-lift devices is analogous to the operation of the slats 13 and therefore such operation will not be described in detail.

The high-lift actuation system 20 is provided to move each slat 13 between a retracted position and an extended position. When the slats 13 are in their extended positions, the amount of lift generated by the wings 12a, 12b is increased, allowing for higher 'angles of attack' without aerodynamic stall of the wings 12a, 12b. The exemplary high-lift actuation system 20 comprises a plurality of actuators 21 for actuation and movement of the plurality of slats 13. The actuators 21 may be, for example, linear actuators or rotary actuators.

The actuators 21 are arranged along the wings 12a, 12b such that each slat 13 is connected to at least one actuator 21. For instance, in the present exemplary high-lift actuation system 20, each slat 13 is connected to two actuators 21. However, in alternative arrangements, each slat 13 may be connected to a single actuator 21, or more than two actuators 21. The region where an actuator 21 is connected to a slat 13 may be considered a "slat station".

The high-lift actuation system 20 further comprises slat transmission shafts 22a, 22b respectively coupled to the actuators 21 provided on each wing 12a, 12b. The slat transmission shafts 22a, 22b extend between the outboard actuator 21 on each wing 12a, 12b and the fuselage 11. Inboard ends of each of the slat transmission shafts 22a, 22b are coupled via a slat angle gearbox 55 to a central transmission shaft 23, which is driven by an output from a hydraulic PDU 30 arranged within the fuselage 11 of the aircraft 10. Thus, in this way, rotation and torque output from the hydraulic PDU 30 is transmitted to the actuators 21 via the central transmission shaft 23 and the slat transmission shafts 22a, 22b, and movement of the slats 13 can be effected.

The high-lift actuation system 20 may also include wing tip brakes 24a, 24b arranged at outboard ends of the transmission shafts 22a, 22b. The wing tip brakes 24a, 24b are provided to prevent undue rotation of the transmission shafts 22a, 22b in the event of a failure of the high-lift actuation system 20. For example, the wing tip brakes 24a, 24b may be applied in the event of a jam in the high-lift actuation system 20 or in the event that the high-lift actuation system 20 is de-powered. Thus, any undue movement of the slats 13 can be prevented. The wing tip brakes 24a, 24b may also be considered as slat outboard brakes.

The transmission shafts 22a, 22b may comprise sliding spline joints (not shown) along the length of the transmission shafts 22a, 22b. This allows the transmission shafts 22a, 22b to change length in order to compensate for any bending of the wings 12a, 12b during flight. Sliding spline joints may also be arranged at interfaces between the transmission shafts 22a, 22b and other components of the high-lift actuation system 20, for example the actuators 21, wing tip brakes 24a, 24b and the central transmission shaft 23.

Further, the high-lift actuation system 20 may include sensors, such as slat outboard position sensors 25a, 25b and/or slat feedback position sensor 26 so that the system can determine the position of the slats 13. The slat outboard position sensors 25a, 25b may be positioned at outboard ends of the transmission shafts 22a, 22b and measure the angular displacement of the transmission shafts 22a, 22b. Further, the slat feedback position sensor 26 may be positioned at an output of the hydraulic PDU 30 to measure the angular displacement (position) of the PDU output (e.g. the output shaft of the hydraulic motor). These sensors may also measure the angular speed of the transmission shafts 22a, 22b and/or the PDU output. Alternatively, the angular speed of the transmission shafts 22a, 22b and/or the PDU output may be derived through differentiation of the measured displacement (position), e.g. by taking the time derivative of their angular displacement measured by the sensors. The speed and/or displacement may be compared to an expected speed and/or displacement or an otherwise predetermined value to determine whether there is a jam in the high-lift actuation system 20.

The high-lift actuation system 20 may be controlled by a controller implemented as part of an on-board computer system 60. For example, the computer system 60 may send control signals to the hydraulic PDU 30 to provide power to the high-lift actuation system 20 to effect movement of the slats 13. The computer system 60 may also send control signals to the wing tip brakes 24a, 24b to prevent rotation of the transmission shafts 22a, 22b. Further, the computer system 60 may gather data from the sensors 25a, 25b, 26 for determining the position of the slats 13 and to determine whether there is a jam in the high-lift actuation system 20.

Figure 2:
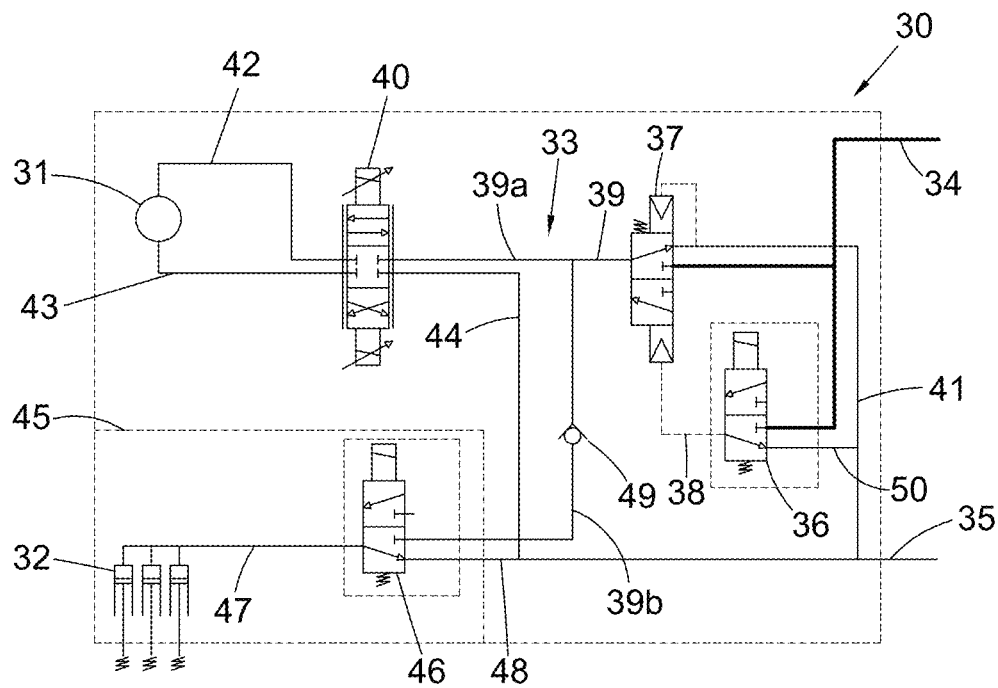
FIG. 2 illustrates a schematic representation of an exemplary hydraulic PDU, showing the hydraulic PDU in a passive state.
Figure 3:
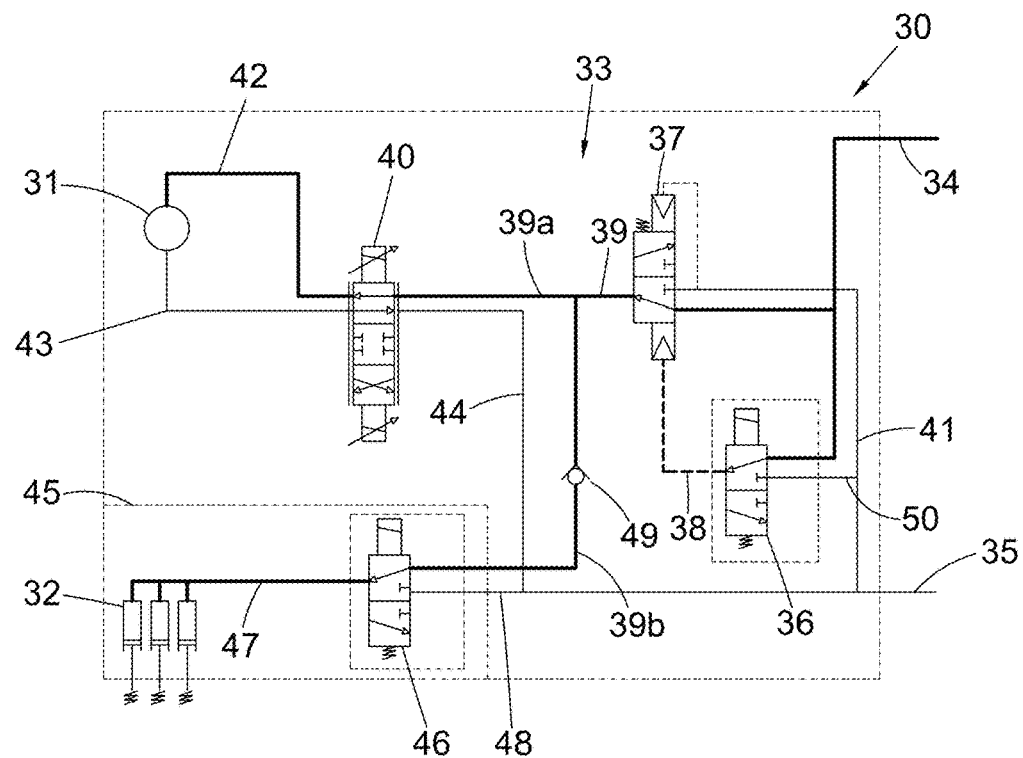
FIG. 3 shows the exemplary hydraulic PDU of FIG. 2 in an active state.
Figure 4:
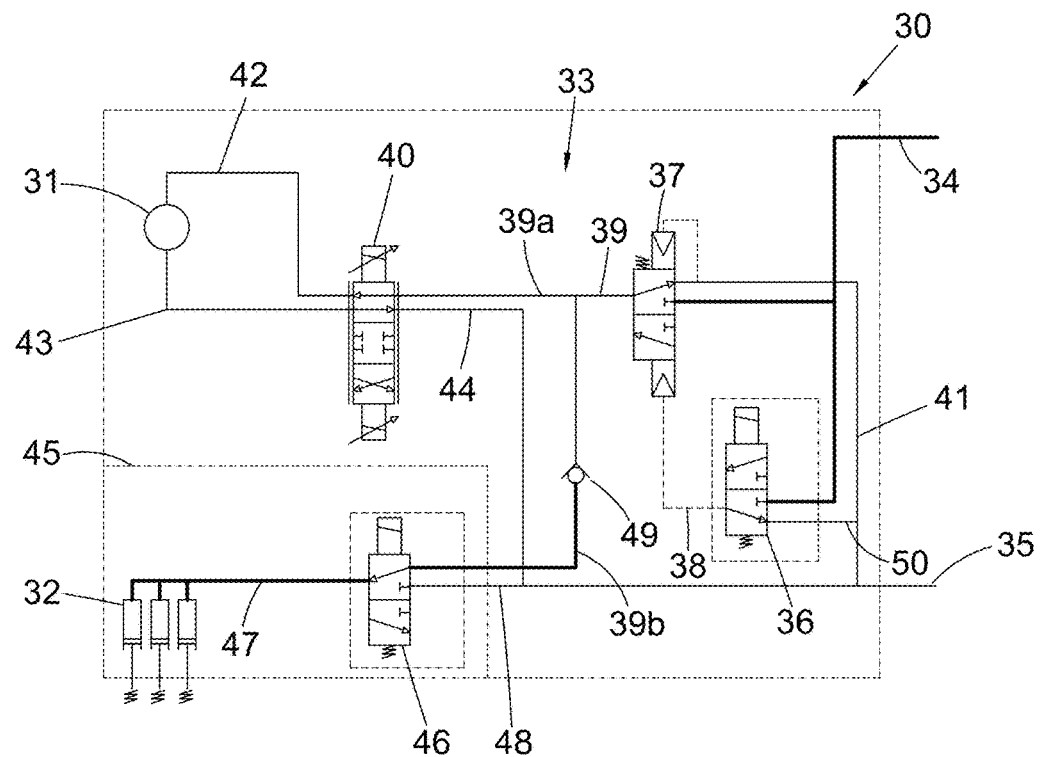
FIG. 4 shows the exemplary hydraulic PDU of FIG. 2 following the detection of an event suggestive of a stall event.

Schematic representations of an exemplary hydraulic PDU 30 are shown in FIGS. 2, 3 and 4. These Figures show the exemplary hydraulic PDU 30 in different states of operation. FIG. 2 illustrates the hydraulic PDU 30 in a passive state, FIG. 3 illustrates the PDU in an active state, and FIG. 3 illustrates the PDU in a state following the detection of an event suggestive of a stall event, such as a jam in the high-lift actuation system 20.

Throughout FIGS. 2, 3 and 4, numerous fluid lines for supplying hydraulic fluid to the components of the hydraulic PDU 30 are indicated by solid and dashed lines. Bold, thick lines are used to indicate the presence of high pressure hydraulic fluid in the fluid lines, whilst thinner lines are used to indicate the presence of hydraulic fluid of a lower, return pressure.

The features of the hydraulic PDU 30 will now be discussed with reference to these Figures, and operation of the PDU 30 will be described later below.

In the embodiment of FIGS. 2, 3 and 4, the hydraulic PDU 30 comprises a hydraulic motor 31, a hydraulic brake system 32 and a hydraulic circuit 33. The hydraulic circuit 33 is arranged for supplying hydraulic fluid pressure to the hydraulic motor 31 and hydraulic brake system 32. The exemplary hydraulic circuit 33 comprises a fluid supply line 34, a fluid return line 35, a two-position enable solenoid valve 36, a two-position enable spool valve 37, a component supply line 39, an EHSV 40, a motor input line 42, a motor output line 43, a motor return line 44, a two-position brake solenoid valve 46, a brake input line 47, a non-return valve 49 and numerous fluid lines 38, 41, 48 and 50 as will be described in further detail below.

In FIG. 2, the hydraulic PDU 30 is in a passive state, i.e. the solenoid valves are de-energised, and the various valves are shown in the position in which fluid can flow away from, rather than be supplied to, the system. In FIG. 3, the hydraulic PDU 30 is in an active state, i.e. the solenoid valves are energised and the various valves are shown in the position in which fluid pressure is supplied to the system and the motor 31 is rotating. FIG. 4 illustrates the hydraulic PDU 30 following the detection of an event suggestive of a stall event in which the enable solenoid 36 and spool valves 37 are de-energised and fluid pressure is not supplied to the motor, 31 but in which fluid pressure to the hydraulic brake system 32 is maintained.

The hydraulic motor 31 converts hydraulic pressure into torque and rotation in response to control signals from the on-board computer system 60. For example, the hydraulic motor may be an axial piston motor such as a swash plate motor or a bent-axis motor, a gear motor, a vane motor, a gerotor motor, an axial plunger motor or a radial piston motor. In the context of the high-lift actuation system 20 described above, the hydraulic motor 31 provides torque and rotation to the central transmission shaft 23 and thereby transmission shafts 22a, 22b to enable operation of the slats 13.

It will be appreciated that in the event of a jam in the high-lift actuation system 20, the transmission shafts 22a, 22b, 23 may be prevented from rotating. In this instance, the hydraulic motor 31 will continue to provide torque to the transmission shafts 22a, 22b, 23 until it drives up to its full stall torque and a stall event occurs. Therefore, by detecting the presence of a jam in the system by, for example, measuring the motion (or lack thereof) of the transmission shafts 22a, 22b, 23, it can be inferred that the hydraulic motor 31 has stalled. Thus, a jam in the high-lift actuation system 20 is an event suggestive of a stall event of the hydraulic motor 31.

The hydraulic brake system 32 is provided to prevent rotation of the hydraulic motor 31 when such rotation is undesirable. For this purpose, the hydraulic brake system 32 may apply a braking force to the hydraulic motor 31 to prevent rotation of the hydraulic motor 31. In the context of the high-lift actuation system 20, the hydraulic brake system 32 may apply a braking force to the hydraulic motor 31 once the slats 13 have been moved into a desired position. In this way, the slats 13 are maintained in their desired position.

Since the slats 13 are only operated during specific parts of a flight, such as during take-off and landing, it will be appreciated that it is desirable for the slats 13 to remain locked in position when their operation is not desired. Hence, the hydraulic brake system 32 is biased by a brake biasing force to apply the braking force to the hydraulic motor 31 unless a sufficiently great hydraulic pressure is provided to overcome the brake biasing force. Therefore, in order to allow rotation of the hydraulic motor 31, hydraulic fluid pressure must be supplied to the hydraulic brake system 32 to release the brake. To engage the brake again the hydraulic pressure is released such that the brake biasing force exceeds the force of the hydraulic pressure, causing the brake to be re-engaged.

The hydraulic circuit 33 of the hydraulic PDU 30 includes the fluid supply line 34 and the fluid return line 35. The fluid supply line 34 may be coupled to a supply of hydraulic fluid. For example, the hydraulic fluid may be stored in a tank (not shown) fluidly connected to the fluid supply line 34 and a hydraulic pump (also not shown) may draw the hydraulic fluid from the tank and pump it through the hydraulic circuit 33. The return line 35 may also be connected to the tank to return the hydraulic fluid to the tank once it has been passed through the hydraulic circuit 33.

In the present exemplary embodiment, the fluid supply line 34 comprises two branches such that hydraulic fluid can be supplied to both the enable solenoid valve 36 and the enable spool valve 37 of the hydraulic circuit 33. The hydraulic PDU 30 may be controlled by operation of the enable solenoid valve 36. When energised (as shown in FIG. 3), the enable solenoid valve 36 may direct fluid from the supply line 34 to the enable spool valve 37 via the fluid line 38. The supply of hydraulic fluid through fluid line 38 causes the enable spool valve 37 to move into an enable position, allowing hydraulic fluid to be directed from the supply line 34 to the component supply line 39 downstream of the enable spool valve 37.

The enable solenoid valve 36 is also connected to the return line 35 via the fluid line 50. Thus, when the enable solenoid valve 36 is not energised (as shown in FIG. 2), fluid supplied to the enable spool valve 37 may flow away from the enable spool valve 37 via the fluid lines 38 and 50 to the return line 35. Absent a flow of fluid pressure from the enable solenoid valve 36, the enable spool valve 37 will move to a disabled position (as shown in FIG. 2) and the supply line 34 will be disconnected from the component supply line 39. In the disabled position, the enable spool valve 37 connects the component supply line 39 to the return line 35 via the fluid line 41 (as shown in FIG. 2) to allow for the fluid to flow away from the hydraulic circuit 33. Thus, when the enable solenoid valve 36 is not energised, hydraulic fluid is allowed to flow away from the hydraulic circuit 33 and the hydraulic circuit 33 is depressurised.

In an alternative arrangement, the enable solenoid valve 36 and the enable spool valve 37 may be replaced by a single two-position solenoid valve for controlling the supply of hydraulic fluid to the component supply line 39. When energised, the two-position solenoid valve may direct fluid from the supply line 34 to the component supply line 39. When de-energised, the two-position solenoid valve may connect the component supply line 39 to the return line 35 via the fluid line 41, in a similar fashion to the enable spool valve 35. However, although a single solenoid valve could be used, due to the high flows involved the valve would need to be very large adding weight and resulting in large signal current requirements.

The component supply line 39 comprises two branches; motor supply line 39a and brake supply line 39b. The motor supply line 39a is configured to supply hydraulic fluid to the hydraulic motor 31, and the brake supply line 39b is configured to supply hydraulic fluid to the hydraulic brake system 32.

A fluid input of the hydraulic motor 31 is connected to the motor input line 42, and a fluid output of the hydraulic motor 31 is connected to the motor output line 43. By supplying hydraulic fluid to either the motor input line 42 or the motor output line 43 the hydraulic motor 31 may be driven in a forward direction or a reverse direction.

The motor supply line 39a leads to the EHSV 40, which is connected to the motor input line 42 and the motor output line 43. The EHSV 40 can be driven into a position such that the motor supply line 39a is connected to the motor input line 42 (as shown in FIG. 3). Alternatively, the EHSV 40 can be driven into a position such that the motor supply line 39a is connected to motor output line 43 (not shown in the Figures). Hence, the EHSV 40 acts as a flow-reversing means to enable control of the direction of fluid flow through the hydraulic motor 31. Accordingly, the EHSV 40 enables control of the direction of rotation of the hydraulic motor.

The motor return line 44 leads from the EHSV 40 to the return line 35 so as to direct fluid output from the hydraulic motor to the return line 35.

Additionally, a motor drain line (not shown) may lead from the hydraulic motor 31 to the motor return line 44 for returning any hydraulic fluid that may leak from the hydraulic motor 31 to the fluid return line 35. The motor drain line may be maintained at an aircraft return pressure, providing a return path for any high pressure hydraulic fluid that leaks from the hydraulic motor 31. For example, when the hydraulic motor 31 is an axial piston motor, high pressure hydraulic fluid may leak past the motor pistons and port plate and the motor drain line provides a return path for this.

The brake supply line 39b leads to the brake solenoid valve 46 provided to control the flow of fluid to the hydraulic brake system 32. When the brake solenoid valve 46 is energised (as shown in FIG. 3), a brake input line 47 of the hydraulic brake system 32 is connected to the brake supply line 39b and hydraulic fluid may be supplied to the hydraulic brake system 32. This removes the braking force from the hydraulic motor 31. Alternatively, when the brake solenoid valve 46 is not energised (as in FIG. 2), the brake input line 47 is connected to the fluid line 48. The fluid line 48 is connected to the motor return line 44 which leads to the return line 35, the fluid line 48 connects into this. (The motor return line 44 extends from the EHSV to the return line 35 and includes the vertical part which is labelled in the drawings and the part continuing perpendicular from the bottom of the vertical part to the return line 35). Thus, when the brake solenoid valve 46 is not energised, hydraulic fluid may flow from the hydraulic brake system 32 to the return line 35 via the fluid line 48 which connects into the motor return line 44.

The exemplary hydraulic PDU 30 also includes a rip-stop boundary 45. The rip-stop boundary 45 is a safety feature to prevent single failures from pressurising the hydraulic motor 31 and the hydraulic brake system 32 resulting in an un-commanded operation of the PDU 30. Cracks in a valve block of a hydraulic PDU can lead to this condition, violating safety requirements. The hydraulic PDU 30 may comprise two separate valve blocks joined together (e.g. bolted together) and separated by the rip-stop boundary 45 so that cracks cannot propagate between them.

In this exemplary hydraulic PDU 30, the EHSV 40, the brake solenoid valve 46 and the motor 31 are connected to the return line 35 through a series of interconnected fluid lines, i.e. motor return line 44 and fluid line 48. This can reduce the size and weight of the hydraulic PDU 30 by reducing the required number of fluid lines. However, the EHSV 40, the brake solenoid valve 46 and the motor 31 may alternatively be connected to the return line 35 by separate individual fluid lines.

As discussed above, the hydraulic brake system 32 is biased such that the braking force is applied to the hydraulic motor 31 (as shown in FIG. 2) unless a sufficiently great hydraulic pressure is applied to the hydraulic brake system 32. Thus, the braking force is applied to the hydraulic motor 31 in the event that a hydraulic pressure in the brake input line 47 is not sufficient to overcome the brake biasing force.

When the brake solenoid valve 46 is energised (as shown in FIG. 3), the brake supply line 39b is connected to the brake input line 47 such that fluid from the brake supply line 39b may be directed to the hydraulic brake system 32. In this way, the braking force can be released by supplying hydraulic fluid to the brake input line 47 such that the pressure in the brake input line 47 is sufficient to overcome the brake biasing force.

Alternatively, when the brake solenoid valve 46 is not energised (as in FIG. 2), the brake input line 47 is connected to the fluid line 48 such that any fluid in the brake input line 47 may flow away via the fluid line 48, which connects into the motor return line 44, leading to the return line 35. This allows the pressure in the brake input line 47 to be reduced and results in application of the braking force to the hydraulic motor 31.

A flow control valve is provided in the brake supply line 39b to restrict or prevent backflow of fluid within the brake supply line 39b. For example, the flow control valve may restrict or prevent hydraulic fluid in the brake supply line 39b from flowing from the brake solenoid valve 46 to the enable spool valve 37. It will be appreciated that the term flow control valve is intended to describe any valve which is capable of controlling the flow of fluid through a fluid line. The flow control valve may be a controllable, active flow control valve that can restrict or prevent flow of hydraulic fluid through the brake supply line 39b in response to control signals received from the on-board computer system 60. However, in the presently described exemplary embodiment, the flow control valve is a passive non-return valve 49 which prevents the flow of hydraulic fluid in the brake supply line 39b from flowing from the brake solenoid valve 46 to the enable spool valve 37 without the need to be supplied with a control signal. It will be appreciated that the use of a passive flow control valve, such as the non-return valve 49, negates the need for the generation of additional signals from the on-board computer system 60 to prevent backflow of fluid within the brake supply line. A non-return valve may also be known as a check valve.

In the present exemplary embodiment, the non-return valve 49 only allows fluid to flow in one direction and prevents fluid in the brake supply line 39b from flowing from the brake solenoid valve 46 to the enable spool valve 37. The non-return valve 49 is a passive component and does not require a control signal from the on-board computer system 60 to prevent flow of hydraulic fluid from the brake solenoid valve 46 to the enable spool valve 37. Thus, in the event that the brake solenoid valve 46 is energised and the enable spool valve 37 is in the disable position (shown in FIG. 4), any fluid upstream of the non-return valve 49 is prevented from flowing through the brake supply line 39b back to the return line 35 via the fluid line 41. Accordingly, in this situation, depressurisation of the hydraulic brake system 32 does not occur and the braking force is not applied.

The operation of the exemplary hydraulic PDU 30 will now be discussed with continued reference to FIGS. 2, 3 and 4. In this example, the supply line 34 of the hydraulic PDU 30 is connected to a supply of hydraulic fluid, for example the supply line 34 may be connected to a tank containing hydraulic fluid and a pump for pumping the hydraulic fluid from the tank to the supply line 34. The return line 35 may also be connected to the tank to return the hydraulic fluid to the tank once it has passed through the hydraulic circuit 33.

To provide a supply of hydraulic fluid to the component supply line 39, the enable solenoid valve 36 is energised in response to a control signal from the on-board computer system 60 so as to connect the supply line 34 to the enable spool valve 37 via the fluid line 38. The hydraulic fluid from the supply line 34 moves the enable spool valve 37 to the enable position, allowing fluid to be sent to the component supply line 39 (shown in FIG. 3).

To enable rotation of the hydraulic motor 31, the EHSV 40 is driven in response to control signals from the on-board computer system 60 so that hydraulic fluid is supplied to the hydraulic motor via the motor input line 42 or the motor output line 43 (shown in FIG. 3). As discussed above, it will be appreciated that the hydraulic motor 31 may be driven in a forward direction or a reverse direction depending on the operation of the EHSV 40.

When used in high-lift systems, such as the high-lift actuation system 20, the hydraulic motor 31 is typically supplied with hydraulic fluid before the braking force applied by the hydraulic brake system 32 is removed from the hydraulic motor 31. Thus, initially, the hydraulic motor 31 is unable to rotate. After a predetermined period of time, the brake solenoid valve 46 is energised so as to cause hydraulic fluid present in brake supply line 39b to be supplied to the hydraulic brake system 32 via the brake input line 47 (shown in FIG. 3). When the pressure of the hydraulic fluid supplied to the hydraulic brake system 32 is sufficient to overcome the brake biasing force, the braking force is removed from the hydraulic motor 31 and it is able to rotate. In the context of the high-lift actuation system 20, rotation of the hydraulic motor 31 is transmitted via the transmission shafts 22a, 22b, 23 to the actuators 21 to enable movement of the slats 13.

FIG. 3 shows the hydraulic PDU 30 in an active state as described above, i.e. where the solenoid valves 36, 40 and 46 are energised. In the active state, hydraulic fluid can be provided to the hydraulic motor 31 and the hydraulic brake system 32 to enable rotation of the hydraulic motor 31.

In some situations, the high-lift actuation system 20 may become jammed such that the transmission shafts 22a, 22b, 23 are unable to rotate freely. In the event of a jam, the hydraulic motor 31 will continue to provide torque to the transmission shafts 22a, 22b, 23 until it drives up to its full stall torque and a stall is detected, or otherwise inferred by the detection of an event suggestive of a stall, for example a jam in the high-lift actuation system 20. This continued rotation of the hydraulic motor 31 applies torque to the non-rotating transmission shafts 22a, 22b, 23 and loads them in torsion, i.e. causes torque to be "locked in".

In one example, the existence of a jam may be determined by comparing values measured by the slat feedback position sensor 26 with expected values. For example, the slat feedback position sensor 26 may take measurements of the angular displacement (position) of the output of the hydraulic PDU 30. The angular speed of the output of the hydraulic PDU may then be determined by taking the time derivative of the measured displacement data. This measured angular speed may be compared to an expected speed based on the input provided to the hydraulic motor 31 or a pre-determined speed, to determine whether a jam has occurred in the high-lift actuation system 20. If the speed is as expected, then a jam has not occurred. If the speed is less than the expected/pre-determined speed, it is determined that a jam has occurred.

The existence of a jam may similarly be determined by comparing an expected angular speed of the transmission shafts 22a, 22b to values of the angular speed of the transmission shafts 22a, 22b derived from displacement values measured by the slat outboard position sensors 25a, 25b.

FIG. 4 shows the state of the hydraulic PDU following detection of an event suggestive of a stall event, for example a determination that a jam has occurred in the high-lift actuation system 20.

Once a stall is detected or otherwise inferred, the enable solenoid valve 36 is de-energised, causing fluid in the fluid line 38 to flow to the return line 35. This moves the enable spool valve 37 to the disabled position and connects the component supply line 39 to the return line 35 via fluid line 41. This prevents the flow of hydraulic fluid from the supply line 34 to the EHSV 40 and brake solenoid valve 46 and depressurises the hydraulic PDU 30.

In the absence of a supply of hydraulic fluid, the hydraulic motor 31 is no longer driven to supply torque and rotation to the transmission lines 22a, 22b, 23. The hydraulic motor 31 is also depressurised so that it may rotate freely. This may be achieved by maintaining the position of the EHSV 40 such that hydraulic fluid in the hydraulic motor 31, the motor input line 42 and the motor output line 43 may flow through the EHSV 40 and to the return line 35. Alternatively, the EHSV 40 may be configured to provide underlap such that hydraulic fluid in the hydraulic motor 31, the motor input line 42 and the motor output line 43 may flow through the EHSV 40 and to the return 35 even if the EHSV 40 is in a closed position (i.e. as shown in FIG. 2). It will be understood that the EHSV 40 is configured to provide underlap when the spool of the EHSV 40 is designed such that it does not fully cover, or close, the ports of the valve even when the spool is in the central, closed position. Thus, there is always a fluid path through the EHSV 40 regardless of the displacement of the spool. Simultaneously, the brake solenoid valve 46 remains energised and the non-return valve 49 prevents hydraulic fluid from flowing from the hydraulic brake system 32 to the return line 35 via the component supply line 39 and fluid line 41. Hence, depressurisation of the hydraulic brake system 32 is prevented and the braking force is not applied to the hydraulic motor 31. Thus, absent any braking force provided to the hydraulic motor 31 by the hydraulic brake system 32, the depressurised hydraulic motor 31 is free to rotate.

The torque and torsion locked in to the transmission shafts 22a, 22b, 23 causes the hydraulic motor 31 to rotate, relaxing the torque and torsion in the transmission shafts 22a, 22b, 23. For example, if the hydraulic motor 31 was driven in a clockwise direction and a jam occurred, the hydraulic motor 31 would continue to rotate in a clockwise direction until a stall was detected or inferred. This applies torque and torsion to the transmission shafts 22a, 22b, 23. Once a stall is detected or inferred, the hydraulic PDU 30 is depressurised, depressurising the hydraulic motor 31 and allowing it to rotate freely. The torque and tension in the transmission shafts 22a, 22b, 23 causes the hydraulic motor 31 to rotate in an anticlockwise direction, relaxing the torque and torsion in the transmission shafts 22a, 22b, 23.

It will be appreciated that during relaxation of the torque and torsion in the transmission shafts 22a, 22b, 23 it is desirous to prevent any undue movement and/or operation of the slats 13. Thus, once a stall is detected or inferred, and before the enable solenoid valve 36 is de-energised, the wing tip brakes 24a, 24b may be applied to prevent any undue rotation of the transmission shafts 22a, 22b, therefore preventing un-commanded operation of the slats 13.

Once the torque and torsion in the transmission shafts 22a, 22b, 23 is sufficiently relaxed, the brake solenoid valve 46 is de-energised in response to control signals from the on-board computer system 60 and the hydraulic brake system 32 is connected to the return line 35 via the fluid line 48 (as shown in FIG. 2). This reduces the hydraulic pressure applied to the hydraulic brake system 32 and the brake biasing force becomes sufficient to apply the braking force to the hydraulic motor 31. Hence, the hydraulic motor 31 is prevented from rotating by application of the braking force.

In an alternative arrangement, the non-return valve 49 may be replaced by an active flow control valve that can be manipulated to control backflow in the brake supply line 39b (rather than a non-return valve that simply prevents flow in the back direction). For example, a control signal from the on-board computer system 60 may be provided to the active flow control valve to prevent backflow in order to allow the torque to be relaxed (i.e. so that the active flow control valve is operated as a non-return valve). Once the torque is sufficiently relaxed, a second control signal may then be provided to allow backflow in the brake supply line 39b in order to depressurise the hydraulic brake system 32 and apply the braking force to the hydraulic motor 31. However, the use of the non-return valve 49 as previously described above negates this need for a controlled device, which requires control signals to prevent backflow and to depressurise the hydraulic brake system 32 when the torque is sufficiently relaxed. Instead, the hydraulic brake system is prevented from depressurising by means of a purely passive component, and depressurisation of the hydraulic brake system 32 can be achieved simply by de-energising the brake solenoid valve 46.

The disclosed hydraulic PDU 30 allows the hydraulic motor 31 to be depressurised without simultaneously depressurising the hydraulic brake system 32. This means that the braking force, used to prevent rotation of the hydraulic motor 31, is not simultaneously applied to the motor 31 when the motor 31 is depressurised. Hence, in the event of a jam in the high-lift actuation system 20, torque and torsion applied to the transmission shafts 22a, 22b, 23 can be removed by allowing the motor to rotate freely.

As discussed previously, in the event of a jam in the high-lift actuation system 20, torque and torsion are loaded into the transmission shafts 22a, 22b, 23 by the hydraulic PDU 30. This places large stresses on the transmission shafts 22a, 22b, 23 and also on the actuators 21. Additionally, bending of the wings 12a, 12b during flight applies loads to the transmission shafts 22a, 22b, 23 perpendicular to a longitudinal axis of the transmission shafts 22a, 22b, 23. The transmission shafts 22a, 22b, 23 are therefore subject to both shear stresses (due to the torque applied by the motor) and normal stresses (due to wing bending). Thus, in prior art systems, the transmission shafts 22a, 22b, 23 are required to have sufficient diameter to prevent failure and deformation. In the same way, large axial loads can also be generated in the actuators 21 and joints connecting the transmission shafts 22a, 22b, 23. Thus, these components are required to be oversized in order to withstand these loads. This adds weight to the high-lift actuation system 20, and therefore the aircraft 10.

Further, it is typical for the transmission shafts 22a, 22b to be positioned not on the neutral axis of the wings 12a, 12b. Therefore, as the wings 12a, 12b bend during flight the length of the transmission shafts 22a, 22b have to change in order to maintain a connection with the PDU and the other components arranged along the wing (e.g. actuators 21). This length adjustment is enabled by the sliding spline joints (not shown) positioned at interfaces between the transmission shafts 22a, 22b and other components of the high-lift actuation system 20, for example the actuators 21, wing tip brakes 24a, 24b and the central transmission shaft 23.

When torque and torsion are loaded into the transmission shafts 22a, 22b by the hydraulic PDU 30 when there is a jam in the high-lift actuation system 20, the sliding spline joints are forced to slide under high levels of torque. Applying torque to the sliding spline joints causes increased friction between the faces of the cooperating splines of the joint, making it more difficult for the splines to slide relative to each other. This can lead to large push and pull loads and can generate large forces along the longitudinal axis of the spline joints into their mating components. In order to withstand these forces, the components of the high-lift actuation system 20 are required to be made larger and stronger, leading to increased weight in the high-lift actuation system 20.

It will be appreciated that the disclosed hydraulic PDU 30 addresses this problem by enabling the reduction in the total stresses (loads) applied to components of the high-lift actuation system 20, such as the transmission shafts 22a, 22b, 23, actuators 21 and transmission joints, in particular a reduction in axial loads due to bending of the wing which only occur when high torques are locked into the transmission. In the event of a transmission system jam, the present disclosure facilitates removal (relaxation) of the transmission torque prior to application of the PDU brake. It achieves this in a simple manner through the provision of the flow restricting device, in particular a passive non-return valve. This is much less complex than other possible solutions that would require dedicated fluid and control lines.

By reducing the total stresses (loads) experienced by these components, they are not required to be made as robust and can be made smaller. This allows the weight of the high-lift actuation system 20 to be reduced. Thus, the disclosure can be considered to solve the problem of application of longitudinal axis loading on the components of a high lift system, and consequently solving the problem of excess weight of the system.

Although the present disclosure has been described in the context of a high-lift actuation system 20, the disclosed hydraulic PDU 30 can be used similarly in other actuation systems on aircraft or indeed in non-aerospace systems.

The invention claimed is:
1. A hydraulic power drive unit (PDU) for a transmission system, the hydraulic PDU comprising:
 a hydraulic motor for converting hydraulic pressure into torque and rotation;
 a hydraulic brake system for applying a braking force to the hydraulic motor to prevent rotation of the hydraulic motor, wherein the hydraulic brake system is biased to apply the braking force to the hydraulic motor to prevent rotation of the hydraulic motor, and configured to remove the braking force in response to a supply of hydraulic pressure; and
 a hydraulic circuit for supplying a flow of hydraulic fluid to the hydraulic motor to pressurise and thereby operate the hydraulic motor and for supplying hydraulic fluid to the hydraulic brake system to pressurise the hydraulic brake system and thereby remove the braking force;
 wherein the hydraulic circuit comprises a brake supply line for supplying the hydraulic fluid to the hydraulic brake system;
 wherein the brake supply line comprises a flow restricting device to restrict backflow of the hydraulic fluid in the brake supply line away from the hydraulic brake system;
 wherein the hydraulic circuit is configured to enable depressurisation of the hydraulic motor while simultaneously preventing depressurisation of the hydraulic brake system to prevent application of the braking force; and
 wherein the hydraulic circuit is configured to depressurise the hydraulic motor upon detection of an event suggestive of a stall event.

2. The hydraulic PDU as claimed in claim 1, wherein the flow restricting device is a non-return valve that prevents backflow of hydraulic fluid in the brake supply line.

3. The hydraulic PDU as claimed in claim 1, wherein the hydraulic circuit is configured to enable depressurisation of the hydraulic motor by means of a motor return line through which fluid supplied to the hydraulic motor may flow away from the hydraulic motor.

4. The hydraulic PDU as claimed in claim 1, wherein the hydraulic motor can rotate freely when the braking force is not applied by the hydraulic brake system.

5. The hydraulic PDU as claimed in claim 1, wherein the hydraulic motor is a reversible hydraulic motor.

6. The hydraulic PDU as claimed in claim 1, wherein the brake supply line comprises a brake solenoid valve to control the flow of fluid to the hydraulic brake system and allow for depressurisation of the hydraulic brake system.

7. The hydraulic PDU as claimed in claim 6, wherein the hydraulic circuit further comprises a return line connected to the brake solenoid valve through which fluid may flow from the hydraulic brake system and the hydraulic brake system thereby depressurised, according to the control of the brake solenoid valve.

8. The hydraulic PDU as claimed in claim 1, wherein the hydraulic circuit comprises a flow-reversing means for controlling a direction of the supply of hydraulic fluid to the hydraulic motor.

9. The hydraulic PDU as claimed in claim 8, wherein the flow-reversing means comprises an electrohydraulic servo valve (EHSV).

10. A high-lift actuation system for operation of high-lift devices of an aircraft, the high-lift actuation system comprising:
 one or more actuators;
 a transmission shaft, wherein the transmission shaft is coupled to the one or more actuators to supply torque and rotation to the one or more actuators; and
 a hydraulic PDU as claimed in claim 1, coupled to the transmission shaft to supply torque and rotation to the transmission shaft.

11. The high-lift actuation system as claimed in claim 10, further comprising one or more sensors for providing information for determining whether a jam may have occurred in the high-lift actuation system.

12. The high-lift actuation system as claimed in claim 11, wherein the one or more sensors measure the angular displacement of the transmission shaft or the angular displacement of an output shaft of the hydraulic motor, and wherein angular speed can be determined from the angular displacement.

13. An aircraft comprising:
a fuselage;
a wing extending from the fuselage;
one or more high-lift devices arranged on the wing for altering the amount of lift generated by the wing; and
a high-lift actuation system comprising:
one or more actuators;
a transmission shaft, wherein the transmission shaft is coupled to the one or more actuators to supply torque and rotation to the one or more actuators; and
a hydraulic power drive unit (PDU) coupled to the transmission shaft to supply torque and rotation to the transmission shaft, wherein the transmission shaft extends at least partly along the wing and wherein each of the one or more high lift devices is coupled to at least one of the one or more actuators for actuation of the one or more high lift devices, and the hydraulic PDU is arranged in the fuselage; and
wherein the hydraulic PDU comprises:
a hydraulic motor for converting hydraulic pressure into torque and rotation;
a hydraulic brake system for applying a braking force to the hydraulic motor to prevent rotation of the hydraulic motor, wherein the hydraulic brake system is biased to apply the braking force to the hydraulic motor to prevent rotation of the hydraulic motor, and configured to remove the braking force in response to a supply of hydraulic pressure; and
a hydraulic circuit for supplying a flow of hydraulic fluid to the hydraulic motor to pressurise and thereby operate the hydraulic motor and for supplying hydraulic fluid to the hydraulic brake system to pressurise the hydraulic brake system and thereby remove the braking force;
wherein the hydraulic circuit comprises a brake supply line for supplying the hydraulic fluid to the hydraulic brake system;
wherein the brake supply line comprises a flow restricting device to restrict backflow of the hydraulic fluid in the brake supply line away from the hydraulic brake system; and
wherein the hydraulic circuit is configured to enable depressurisation of the hydraulic motor while simultaneously preventing depressurisation of the hydraulic brake system to prevent application of the braking force.

14. The aircraft as claimed in claim 13, wherein the high-lift devices comprise slats arranged along a leading edge of the wing, or flaps arranged along a trailing edge of the wing.

15. A method for operating a power drive unit (PDU) comprising:
supplying hydraulic fluid to a hydraulic motor via a hydraulic circuit to pressurise the hydraulic motor which converts hydraulic pressure into torque and rotation; and
supplying hydraulic fluid to a hydraulic brake system via a brake supply line of the hydraulic circuit to pressurise the hydraulic brake system and thereby remove a braking force applied to the hydraulic motor so as to allow for rotation of the hydraulic motor; followed by
depressurising the hydraulic motor whilst restricting backflow of hydraulic fluid in the brake supply line away from the hydraulic brake system such that the hydraulic motor is depressurised whilst depressurisation of the hydraulic brake system is simultaneously prevented thereby preventing application of the braking force;
wherein the step of depressurising the hydraulic motor whilst restricting backflow of hydraulic fluid in the brake supply line is carried out following the detection of an event suggestive of a stall event of the motor.

16. The method as claimed in claim 15, wherein restricting backflow of hydraulic fluid in the brake supply line comprises preventing backflow of hydraulic fluid in the brake supply line.

17. The method as claimed in claim 15 further comprising the subsequent step of depressurising the hydraulic brake system to thereby apply the braking force to the hydraulic motor to prevent rotation of the hydraulic motor.

18. A method of relaxing torque locked into a transmission shaft of an aircraft high-lift actuation system driven by a hydraulic motor of a hydraulic PDU, comprising:
determining whether a jam may have occurred in the high-lift actuation system, and if it is determined that a jam may have occurred, then:
de-pressurising the hydraulic motor to remove torque from an output shaft of the hydraulic PDU whilst simultaneously restricting backflow of hydraulic fluid in a brake supply line of a hydraulic brake system acting on the hydraulic motor, so as to prevent depressurisation of the brake system and thereby prevent application of a braking force to the hydraulic motor whereby torque locked into the transmission shaft is relaxed;
after de-pressurising the hydraulic motor, depressurising the hydraulic brake system so as apply the braking force to the hydraulic motor.

19. The method as claimed in claim 16, wherein preventing backflow of hydraulic fluid in the brake supply line is by means of a non-return valve in the brake supply line.

20. The method as claimed in claim 17, wherein depressurising the hydraulic brake system to thereby apply the braking force to the hydraulic motor to prevent rotation of the hydraulic motor is by means of a brake solenoid valve that directs flow away from the hydraulic brake system through a return line separate to the brake supply line.

* * * * *